(12) United States Patent
Hütter et al.

(10) Patent No.: US 7,984,191 B2
(45) Date of Patent: Jul. 19, 2011

(54) UPDATING PARAMETERS IN A BRIDGED MULTISTANDARD HOME NETWORK

(75) Inventors: Ingo Hütter, Pattensen (DE); Michael Weber, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 12/853,373

(22) Filed: Oct. 7, 2010

(65) Prior Publication Data

US 2011/0022731 A1    Jan. 27, 2011

Related U.S. Application Data

(62) Division of application No. 10/542,585, filed on Jan. 6, 2006, now Pat. No. 7,865,622.

(51) Int. Cl.
*H04L 12/46* (2006.01)
*G06F 15/16* (2006.01)

(52) U.S. Cl. ..... 709/249; 709/246; 709/203; 370/395.2; 370/401; 370/466; 710/72; 726/12

(58) Field of Classification Search ................... 709/246, 709/249; 370/395.2, 401, 466; 710/72; 726/12
See application file for complete search history.

(56) References Cited

U.S. PATENT DOCUMENTS

| 6,349,352 | B1 | 2/2002 | Lea | 710/72 |
|---|---|---|---|---|
| 6,618,764 | B1 | 9/2003 | Shteyn | 709/249 |
| 6,892,230 | B1 | 5/2005 | Gu et al. | 709/220 |
| 7,085,814 | B1 * | 8/2006 | Gandhi et al. | 709/208 |
| 7,130,925 | B2 | 10/2006 | Noda et al. | 709/249 |
| 7,149,785 | B1 | 12/2006 | Nakamura | 709/208 |
| 7,299,304 | B2 | 11/2007 | Saint-Hilaire et al. | 710/11 |
| 7,337,402 | B2 | 2/2008 | Milton et al. | 715/730 |
| 7,539,747 | B2 | 5/2009 | Lucovsky et al. | 709/224 |
| 2001/0032273 | A1 | 10/2001 | Cheng | 709/249 |

(Continued)

FOREIGN PATENT DOCUMENTS

DE    102 27 062 A1    1/2004

(Continued)

OTHER PUBLICATIONS

Richard G. Golden: "Service Advertisement and Discovery: Enabling Universal Device Cooperation". IEEE Internet Computing, IEEE Service Center, Piscataway, NJ US, Oct. 31, 2000, pp. 18-26.

(Continued)

*Primary Examiner* — Alina N. Boutah
(74) *Attorney, Agent, or Firm* — Robert D. Shedd; Joseph J. Opalach; Catherine A. Cooper

(57) ABSTRACT

The invention relates to the field of home networks, in particular to the connection of two home networks of different types via a gateway. The network appliances in the network of the first type are also intended to be able to control the network appliances in the network of the second type, and vice versa. One problem that occurs when carrying out conversion processes on control messages is that an input parameter which is known in the network of the first type can be changed as required and can also be signaled further within this network, but the associated correspondence in the network of the second type is permanently set, and accordingly cannot be changed. The invention provides a way in which an input parameter such as this can nevertheless be likewise updated in the network of the second type.

4 Claims, 3 Drawing Sheets

U.S. PATENT DOCUMENTS

| | | | |
|---|---|---|---|
| 2001/0051930 A1 | 12/2001 | Nakamura | 705/56 |
| 2002/0004711 A1 | 1/2002 | Sato et al. | 702/188 |
| 2002/0035621 A1 | 3/2002 | Zintel et al. | 709/220 |
| 2002/0078161 A1 | 6/2002 | Cheng | 709/208 |
| 2002/0083143 A1 | 6/2002 | Cheng | |
| 2002/0116550 A1 | 8/2002 | Hansen | 709/330 |
| 2003/0005130 A1* | 1/2003 | Cheng | 709/228 |
| 2003/0016682 A1 | 1/2003 | Cho | 370/401 |
| 2003/0063608 A1 | 4/2003 | Moonen | 370/390 |
| 2003/0106062 A1 | 6/2003 | Shteyn et al. | 725/78 |
| 2003/0110298 A1 | 6/2003 | Lanigan | 709/246 |
| 2003/0110334 A1 | 6/2003 | Lanigan et al. | 710/72 |
| 2003/0177270 A1* | 9/2003 | Noda et al. | 709/246 |
| 2005/0010689 A1 | 1/2005 | Henry et al. | 709/246 |
| 2005/0018696 A1 | 1/2005 | Henry | 370/401 |
| 2005/0078679 A1 | 4/2005 | Henry et al. | 370/395.2 |
| 2006/0168159 A1* | 7/2006 | Weisman et al. | 709/220 |
| 2006/0184661 A1 | 8/2006 | Weisman et al. | 709/224 |
| 2006/0230130 A1 | 10/2006 | Cho et al. | 709/223 |

FOREIGN PATENT DOCUMENTS

| | | |
|---|---|---|
| DE | 10227062 A1 | 1/2004 |
| EP | 1058422 | 12/2000 |
| EP | 1058422 A1 | 12/2000 |
| EP | 1355485 A1 | 10/2003 |
| EP | 1 394 986 A1 | 3/2004 |
| EP | 1394986 A1 | 3/2004 |
| WO | 0101632 A1 | 1/2001 |
| WO | WO 01/01632 | 1/2001 |
| WO | 02/01833 A1 | 1/2002 |
| WO | 0209350 A1 | 1/2002 |
| WO | 0209384 A1 | 1/2002 |
| WO | WO 02/01833 A1 | 1/2002 |
| WO | WO 02/09350 | 1/2002 |
| WO | WO 02/09384 | 1/2002 |

OTHER PUBLICATIONS

Search Report Dated Apr. 15, 2004.

* cited by examiner

UPDATING PARAMETERS IN A BRIDGED MULTISTANDARD HOME NETWORK

This application is a divisional of U.S. application Ser. No. 10/542,585, filed Jan. 6, 2006 now U.S. Pat. No. 7,865,622, herein incorporated by reference.

The invention relates to the technical field of home networks. In particular the invention resides in the area where a network of a first type, for example an HAVi-based home network, is connected to a network of a second type, for example UPnP-based home network, via a gateway.

BACKGROUND OF THE INVENTION

Various home network standards have now become available for networking of appliances in the domestic area. In particular, the IEEE 1394 bus standard has become established in the field of entertainment electronics. This allows communication between the entertainment electronic appliances at a very high data rate. Data rates of 100, 200 and 400 Mbit/s are supported. This is sufficient to transmit asynchronous data packets for controlling the network stations, as well as isochronous audio and video data streams, in parallel. IEEE Standard 1394, however, specifies only the lower layers of the ISO/OSI reference model for data communication, that is to say the bit transmission layer (physical layer), the data protection layer (Data Link Layer) and parts of the switching layer (Network Layer). The higher layers, that is to say the transport layer, the communication control layer (Session Layer), the presentation layer and the application layer, are, however, unspecified.

A consortium of entertainment electronics companies have also taken on the task of defining the higher layers for interchanging data between entertainment electronic appliances. This standard is known by the abbreviation HAVi, where HAVi stands for Home Audio/Video interoperability. This standard specifies a so-called Interoperability Middleware, which ensures that products from different manufacturers understand one another, that is to say cooperate in order to carry out tasks together via the network.

Another consortium of companies, in particular the computer industry companies led by Microsoft, have started a different initiative for specification of network control software based on the existing Internet Protocol (IP). This network system has become known by the abbreviation UPnP (Universal Plug and Play). In this system, the specification does not relate primarily to entertainment electronic appliances, but other appliances can also be integrated in the network, in particular such as personal computers, domestic appliances in the white good range, such as refrigerators, microwave cookers, washing machines, heating controllers, light controllers, alarm system controllers, etc.

Even though the two home network standards HAVi and UPnP are sometimes regarded as competitors, at least in part they serve a different purpose and a scenario is presupposed in which the two networks can exist alongside one another in a domestic environment, and are connected to one another via a gateway. It should then be possible to control the appliances in the UPnP network from the HAVi network side, and vice versa. The connection unit between the two networks is referred to in the following text as a gateway. The expression gateway is frequently not the same as the other expression bridge circuit or bridge, which is likewise used. In some cases, however, the difference between a bridge circuit and a gateway is that a bridge circuit transmits the data packets on the data protection layer to the respective other network while, in contrast, in the case of a gateway, the data packets are in fact transmitted at a higher level in the ISO/OSI reference model.

The work so far relating to gateways for the connection of HAVi and UPnP networks has always been based on a so-called "proxy-based gateway" approach. This conceals the following: in order that the UPnP network stations are visible from an HAVi appliance, the UPnP appliances are represented on the HAVi side in the gateway by so-called HAVi-DCMs. DCM in this case stands for Device Control Module. These additional DCMs are then logged in the HAVi network and can be addressed from the HAVi appliances. One DCM is in this case required for each UPnP network station. If the network station offers different functionalities, such as a television which has the function of a tuner, of an amplifier and of a display unit, then a number of so-called FCMs may be provided for each DCM. An FCM is in this case a so-called functional component module, by means of which an appliance functionality is thus covered.

Conversely, the HAVi network stations should also be addressed from the UPnP side. On the UPnP side, an HAVi appliance is represented by a so-called UPnP device. This means that a corresponding UPnP device is also provided in the gateway for each HAVi network station. A so-called XML appliance description exists for each UPnP device. In this case, XML stands for the description language Extension Markup Language. The corresponding feature for an HAVi FCM on the UPnP side is a so-called service. A number of UPnP services can thus be described in one UPnP device. The conversion between HAVi DCM/FCM and UPnP devices/services should be as complete as possible. However, if the two standards are compared, it is evident that such complete conversion is not always possible.

UPnP appliances invariably originate from areas beyond entertainment electronic appliances, so that the functionalities of such appliances, such as a washing machine, cannot easily be mapped onto the normal functionalities of entertainment electronic appliances. How this can nevertheless still be successfully accomplished for the representation of UPnP appliances on the HAVi side is evident from the previous European Patent Application EP 02 090 147.6 from the same applicant.

INVENTION

During the development work relating to the merging of the different home networks on an HAVi and UPnP basis, the inventor encountered a problem in that complete one-to-one conversion between HAVi and UPnP functionalities is likewise not possible. On the HAVi side, a functionality such as this is the capability to allocate a user-defined name to an HAVi network station. This can be chosen freely by the user, and can also be changed retrospectively. The HAVi specification in this context states that the parameter UserPreferredName can be defined for each appliance. If this appliance name is changed, then the changes are signaled via so-called events to all the other HAVi network stations which then make the appropriate change visible, if they are equipped with a display unit. If the changed appliance name is also intended to be visible on the UPnP side, then the parameter UserPreferredName must be mapped onto a corresponding information element in the associated XML appliance description. The only element which may be used for this purpose on the UPnP side has the designation "FriendlyName" and is part of the XML appliance description. The UPnP specification is, however, predicated on the XML appliance descriptions being documents that cannot be changed. Specifically, there is no capability to inform UPnP appliances that, for example, the previously instantiated XML appliance description has changed and, so to speak, should therefore be updated for the UPnP appliances.

Nevertheless, the invention has the aim of providing the capability to make the changed appliance names consistently visible between the networks. The solution according to the invention comprises the UPnP network stations being forced once again to read the updated XML appliance description by the HAVi network station whose appliance name has been changed logging off and then logging on once again.

A software module is advantageously provided at the gateway, which evaluates the appliance name change event and then ensures that the logging-off message is sent to the UPnP side, initiating the reinitialization of the associated XML description and ensuring that the message for the appropriate HAVi appliance to log on again is sent to the UPnP side. In particular, the discovery message of the ssdp::byebye type can advantageously be used as the logging-off message. The discovery message of the ssdp::alive type can advantageously be used as the logging-on message. The information element in the XML appliance description which best represents the appliance name has the designation FriendlyName on the UPnP side.

One advantageous development of the invention provides for a text input menu to be provided for user-defined inputting of the appliance name, with this menu being overlaid on a display unit on the HAVi side, and which is designed such that the text can be input with the aid of the number keys on a remote control.

DRAWINGS

Exemplary embodiments of the invention will be explained in more detail in the following description and are illustrated in the drawings, in which.

DESCRIPTION OF THE INVENTION

Figure 1:
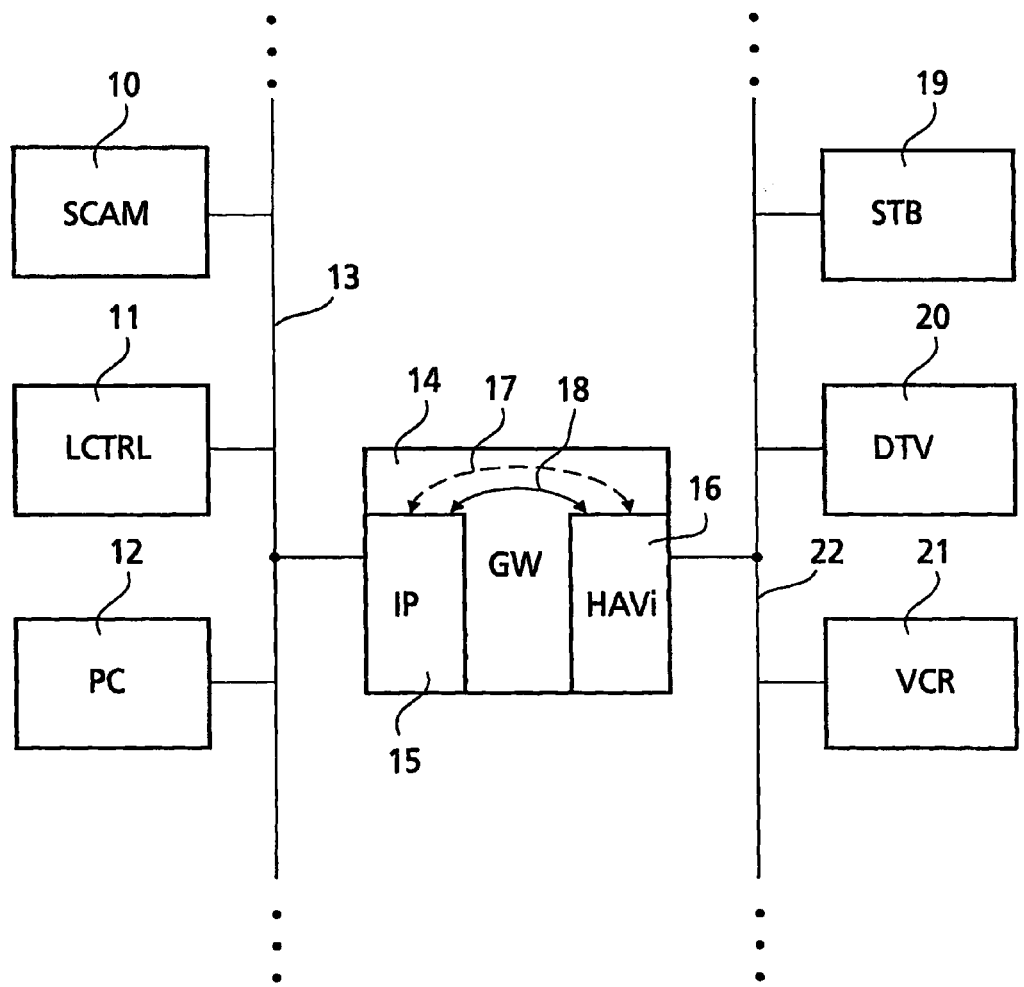
FIG. 1 shows an illustration of two home networks which are connected to one another via a gateway.

FIG. 1 shows the basic structure of two home networks which are connected to one another via a gateway. A UPnP-based home network is shown in the left-hand side of FIG. 1. The reference number 10 denotes a monitoring camera, as an example of a UPnP appliance. The reference number 11 denotes a light control unit, as a further example of a UPnP network station. The reference number 12 also denotes a personal computer, which is likewise integrated in the UPnP network. The UPnP appliances are linked via a network connection 13. The widely used and known Ethernet Bus should be mentioned as a typical example of a network connection 13 such as this.

An example of a home network which is designed in accordance with the HAVi standard is shown on the right-hand side of FIG. 1. The reference number 19 denotes a so-called set-top box, which is a receiver for digital television. The reference number 20 denotes a digital TV. Digital televisions such as these typically no longer have their own receiving section, but receive the digital video and audio data from some other appliance, for example from the set-top box 19. In the illustrated situation, the video and audio data is, however, transported via the network cable to the digital television 20. The reference number 21 denotes a video recorder. The network cable is marked by the reference number 22. In the assumed example of an HAVi network, this network cable 22 is formed by the so-called IEEE 1394 bus.

The gateway 14 is illustrated in the center of FIG. 1 and connects the two networks to one another. For this purpose, on the one hand a so-called IP stack 15 and on the other hand a so-called HAVi stack 16 are provided in the gateway 14. The IP stack 15 and the HAVi stack 16 contain all of the software components which are required for participation in the respectively connected network. In addition, the gateway 14 contains further software components, which are not listed separately. However, the illustration shows schematically that data is interchanged between the two software stacks 15 and 16. The reference number 17 in this case denotes the data path for the audio and video data streams. The reference number 18, in contrast, denotes the data path for the control messages which need to be exchanged between the two software stacks.

The HAVi standard as well as the UPnP specification have been published. Version 1.1 of the HAVi specification is now available. The precise title is: The HAVi Specification "Specification of the Home Audio/Video interoperability (HAVi) Architecture", Version 1.1, 15 May 2001. The UPnP specification can be obtained from the company Microsoft. Further information is also available on the official Internet page for the UPnP system. For this purpose, reference should be made to the Internet page www.UPnP.org.

Since the components of the HAVi system and of the UPnP system are not all important in order to explain the present invention, only the essential components will be explained in more detail in the following text. For further details relating to the disclosure of the invention, express reference is made to the two specifications mentioned above.

Figure 2:
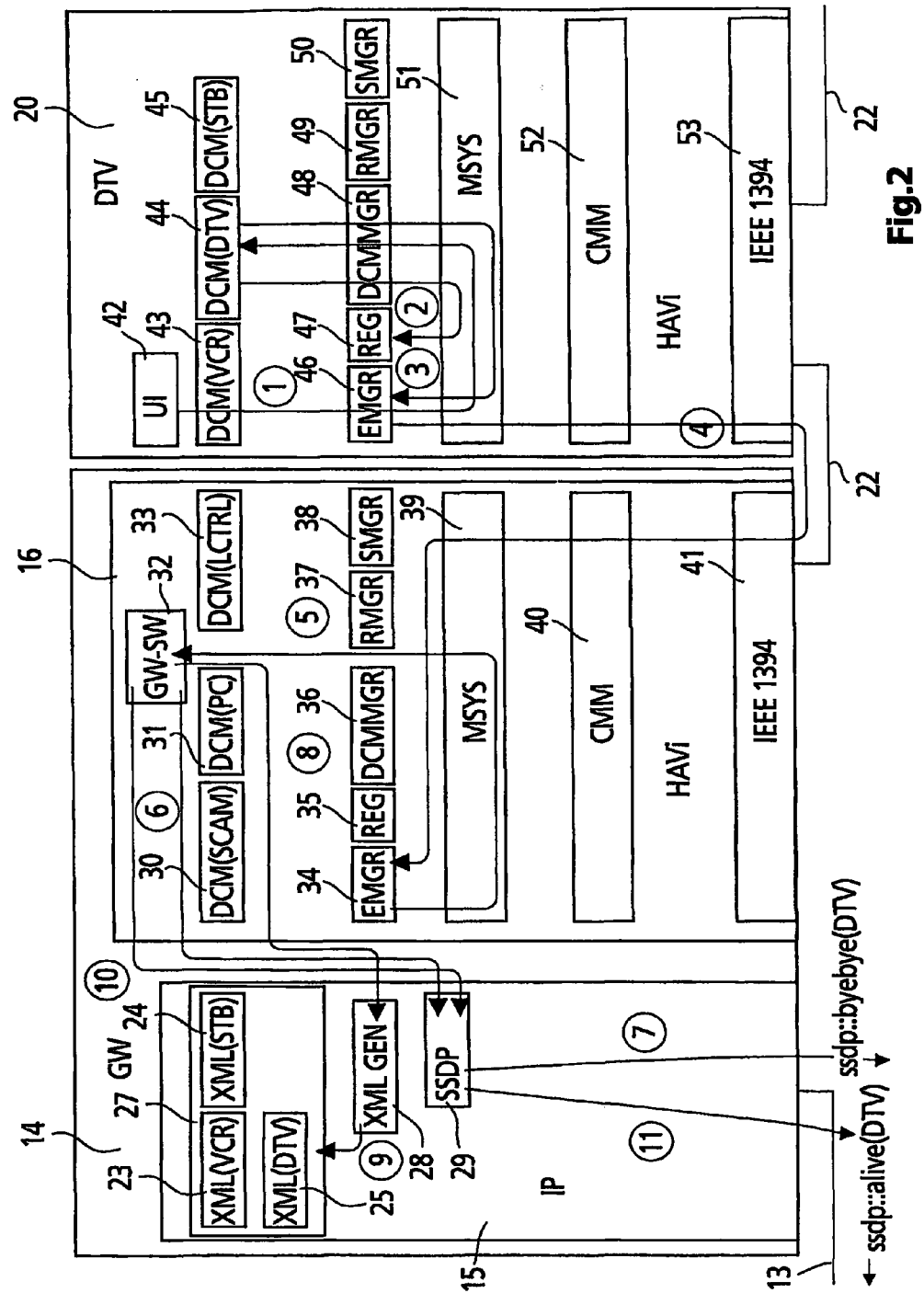
FIG. 2 shows the procedure for the method according to the invention, and the interaction of the software components in the HAVi appliance whose appliance name is changed, and in the gateway.

In FIG. 2, the same reference numbers denote the components which are also illustrated in FIG. 1. The major software components of the gateway 14 are shown on the left-hand side of FIG. 2. The major software components of the digital television 20 are shown on the right-hand side of FIG. 2. As has already been explained with reference to FIG. 1, gateway 14 contains an Internet Protocol stack 15 for communication in the UPnP network, and an HAVi stack 16 for communication in the HAVi network. The IEEE 1394 interface 41 is shown on the lowermost level of the HAVi stack 16. This is typically not in the form of a software component. In fact, the IEEE Standard 1394 stipulates that both the bit transmission layer and the data protection layer must be in the form of hardware. Two separate ICs are typically used for this purpose. Furthermore, the so-called communication media manager 40 is in the form of a software component. This forms parts of the switching layer and of the transport layer, and forms an interface between the other software elements and the IEEE 1394 bus. The so-called messaging system 39 is implemented above the communication media manager 40. In the HAVi standard, this component is a very important component, since the messaging system is used whenever two different software modules wish to interchange data with one another. The messaging system is independent of the network and transport layer in the ISO/OSI reference model.

A further module in the HAVi stack is a so-called event manager 34. The object of the event manager 34 is to inform the various software elements in the network of changes/events which have occurred. Events such as these occur in particular when an appliance is added to the network or is disconnected from the network. A further software component of the HAVi stack 16 is a so-called registry 35. The available software elements of the network are listed in the registry. The registry offers the service of searching for specific software elements. A software element which wishes to communicate with other software elements in the network must be registered in the registry. A further software element in the HAVi stack 16 is a so-called DCM manager 36 whose object is to install the DCMs (Device Control Modules) in the respective network station.

Applications which are implemented in the network access a number of so-called FCMs (Functional Component Modules). The functionalities of various types of FCMs are specified in the HAVi standard itself. These include a tuner FCM, VCR FCM, Clock FCM, Camera FCM, AV Disc FCM, Amplifier FCM, Display FMC, AV Display FCM, Modem FCM and Webproxy FCM.

The resource manager 37 has the task of monitoring whether specific resources in the network are still available for a respectively demanding task, or whether they have already been allocated. It thus allocates appropriate resources to the application programs, provided that they are free.

A so-called stream manager 38 is also provided as a further component in the HAVi stack, and is responsible for setting up connections between network subscriber stations. AV data streams can then be transmitted via the connections which have been set up.

Various DCM modules are also set up in the gateway, above the software elements, which have already been described, on the HAVi stack. A DCM is a software element which is used on the HAVi side in order to control a corresponding HAVi appliance. An associated HAVi DCM is therefore installed in the gateway for each UPnP appliance, in order to control the UPnP appliances. By way of example, the reference number 30 denotes the DCM for the monitoring camera 10 in the UPnP network. The DCM 31 is used to control the personal computer 12 in the UPnP network. An associated DCM 33 is also provided in the HAVi gateway 14 for the light control unit 11. In accordance with the HAVi specification, the other DCMs in the HAVi network can also be installed in the HAVi gateway 14, but need not be, as is shown in the example in FIG. 2. Reference number 32 also denotes the application program for the gateway 14. The functions which this module carries out will be explained in more detail in the following text.

The IP stack 15, which is likewise provided in the gateway 14, is not shown with all its components. The configuration of an IP stack such as this is known from the prior art. Only three major components are therefore illustrated, in order to simplify the illustration. The first of these is a so-called HTTP Webserver 27 which contains the various XML appliance descriptions for the appliances in the HAVi network, that is to say an XML appliance description 23 for the video recorder 21, an XML appliance description 24 for the set-top-box 19, and an XML appliance description 25 for the digital television 20. A unit to implement the SSDP protocol is also provided as a further component of the IP stack 15, and is annotated by the reference number 29. The SSDP Protocol (Simple Service Discovery Protocol) is likewise assumed to be known. A further component is also an XML appliance description production unit 28. This is also regarded as a conventional implementation for the gateway technology that is available nowadays. The component need not be regarded as part of the IP stack 15, and can also be implemented as a unit separated from it.

The individual software elements of the HAVi stack are likewise listed separately for the digital television 20. Since these components are annotated by the same letter abbreviations as those in the HAVi stack 16 in the gateway 14, there is no need to explain these parts once again in detail.

The digital television 20 in the exemplary embodiment is assumed to be a so-called FAV appliance (Full AV Device). An appliance such as this is equipped with a very large number of HAVi software elements. The special feature is that an FAV appliance also has a so-called Java virtual machine integrated in it. The appliance is thus able to convert Java code to program code that can be run, and then to run it in an appropriate manner. An FAV appliance has the capability to load a DCM from some other HAVi network appliance. The DCM is then installed in the FAV appliance together with the DCM for the FAV appliance. FIG. 2 therefore shows that the DCMs 43 and 45 for controlling the video recorder 21 and the set-top-box 19 are also installed together with the DCM for the digital television 44. The illustration likewise also shows a user interface 42.

The way in which the various software elements interact when the user-defined appliance name for the digital television 20 is changed in the HAVi network will now be described in detail in the following text. The input parameter UserPreferredName is provided in the HAVi system in order to identify a user-defined appliance name. This parameter is part of every DCM. However, the parameter is also stored, for example, in the registry for the respective appliance. The user would like to allocate a unique name to the individual appliances in the network. If there are two or more appliances in the same category in the network, for example a television which is located in the living room and a television in the bedroom, then it should easily be possible to distinguish between these appliances. For example, for this purpose, the user can give the name "living room TV" to the television in the living room. Once he has entered the name via the user interface, the user interface 42 will inform the DCM for the digital television 20, with the assistance of the messaging system 51, that a new input parameter UserPreferredName has been entered for the television, marked with the label ①. For this purpose, the user interface 42 uses the service DCM::SetUserPreferredName which is available in the DCM. In addition to updating the parameter in the DCM itself, this service also initiates the reregistration of the new name in the registry 47, which is identified by the label ②. Once all of the entries relating to this parameter have been updated, the DCM 44 then initiates a notification to the event manager 46. This step is marked by the label ③, and is carried out by the DCM 44 generating a so-called UserPreferredNameChangedEvent. Since this event is classified as a global event within the HAVi system, this results in the event manager 46 passing on this event. The label ④ denotes the notification of the gateway 14 via the UserPreferredNameChangedEvent for the digital television 20. All of the software elements of the gateway 14 which are of interest to this event have been registered in the event manager 34.

Specifically, the gateway software module 32 for the event manager 34 has been able to register for the UserPreferredNameChanged Event. The event manager 34 will then inform the gateway software 32 of the arrival of the UserPreferredNameChangedEvent relating to the digital television 20, see the label ⑤. Notification of the gateway software 32 then leads to the emission of a notification to the UPnP protocol stack 15 for the gateway. This is identified by the mark ⑥ in FIG. 2. Since the UPnP protocol stack 15 does not, however, accept any specified HAVi messages, the gateway software 32 has to initiate a translation of this message to the format which the UPnP stack 15 can understand. The associated UPnP message which can be understood by the UPnP stack 15 may be based on the so-called SOAP protocol (Simple Object Access Protocol). The gateway software 32 therefore has to initiate, or itself carry out, a conversion of the HAVi message to the form of an SOAP message. Since both systems are specified, this conversion could be carried out without any further difficulties. The SSDP unit 29 then converts the corresponding SOAP message based on the SSDP protocol to an SSDP discovery message. Alternatively, this may also be implemented in such a way that the gateway software 32 informs the software module which represents the HAVi appliance as a UPnP appliance of the change to the name. This module then uses the SSDP module 29 to generate the discovery message ssdp::byebye(DTV), which is passed on in the UPnP network to all of the subscriber stations. This is identified by the mark ⑦.

This notification results in the digital television 20 logging off in the UPnP network. This means that a UPnP appliance which is currently displaying the network structure completely, including the HAVi appliances, on a display unit will briefly mask out the digital television 20 from the display. Once the digital television 20 has logged off, the gateway software 32 then ensures in the step marked by the mark ⑧. that the XML appliance description production unit 28 generates a new XML description for the digital television 20. This is done by the software module 32 replacing the old "FriendlyName" by the new "UserPreferredName", which is received for each event, in the XML document and replacing the old XML description 25 on the Webserver 27 by the new one. The associated step is identified by the mark ⑨.

Once the new appliance description has been produced, the gateway software 32 once again produces an SOAP message for the SSDP module 29, label ⑩. This SOAP message is converted by the SSDP module to an SSDP discovery message, to be precise this being the ssdp::alive(DTV) message. The digital television 20 once again uses this message to log on in the UPnP network once again, label ⑪. The conversion of the DCM 44 to the associated XML description 25 takes only a short time, for example a few milliseconds. The logging-on message is therefore likewise transmitted only a short time after the logging-off message to the UPnP network. The logging-off of the DTV appliance 20 in the meantime is therefore not perceived, or is scarcely perceived, by the user. When the digital television 20 logs on again, the UPnP appliances are requested to once again load the XML description for the digital television 20. Once this process has been completed, the new appliance name is also updated in the UPnP network and is taken into account in the display, that is to say the new appliance name will be displayed on the respective display unit.

This procedure ensures the consistency of naming between networks. The procedure comprising the HAVi appliance previously logging off and then logging on again ensures that the name of an HAVi network appliance is never inconsistent in any phase.

Figure 3:
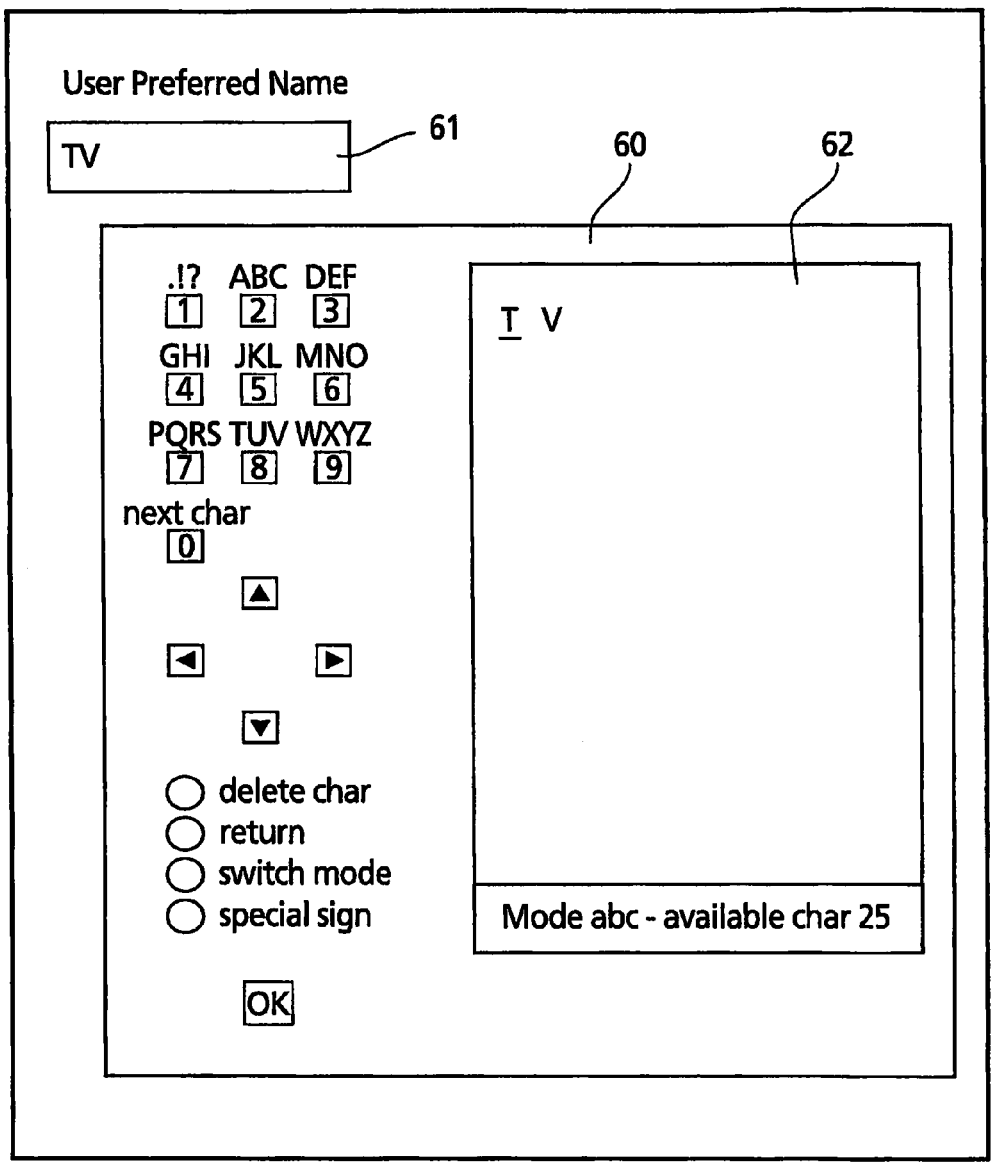
FIG. 3 shows the text input menu according to the invention.

The following text also provides an explanation of how the text input for a text field can advantageously be entered in a user interface by means of a conventional remote control. FIG. 3 shows a text input menu according to the invention, which is identified by the reference number 60 in the figure. The illustration likewise shows a text field within the user interface for controlling the digital television 20 that is located in the HAVi network. This text field is provided with the reference number 61 which corresponds to the input field for the input parameter UserPreferredName. The illustration shows that the standard entry TV is currently entered in this field. Once the user has focused this text field, that is to say has selected it using the remote control, the input menu 60 is started by pressing the "text input key" on the remote control.

After pressing the "text input key" on the remote control, a check is carried out to determine whether a text input field is focused which may be located in a havlet, an application or in the FAV's own UI.

The text input menu appears in the form of a window on the display unit for the television. A larger text input window 62 is provided within the text input menu 60. The normal keys of a remote control are symbolized alongside this text input window. These include the number keys, the cursor control keys, a selection key and the different colored keys whose importance is in each case indicated in abbreviated form alongside the colored symbol. The symbols above the number keys in each case show which letters can be selected using that number key for a text input. The text is therefore input simply by means of a remote control via the number keys, for example in the form that is known from mobile telephones. In this context, it is also possible to integrate automatic word identification in the text input tool. For example, the word identification system T9 is also used in mobile telephones. As is illustrated in FIG. 3, once the text input menu has been opened automatically, the current content of the focused text field is automatically copied into the text input field 62. The blinking of a cursor underneath this then indicates that the individual letters in the standard entry can be changed. Once the new name has been entered, the new entry is copied into the text field 61 by pushing the input key OK. If "OK" in the "text input tool" is pressed, the amended text is copied to the text input field 61, and is focused. This thus results once again in the same state as before the text input, but with the text in the text input field having been changed. In order to end the text input, "OK" must be pressed once again. In the state before starting and after ending the "text tool", a correct keypad can be used to enter text or else to enter numbers via the number keys of the remote control.

The text input tool may be in the form of a central tool within the HAVi UI 42 of the digital television 20. The text input tool is provided for the situation in which no keypad is actually delivered for the digital television, but only a normal remote control. The programming conversion for this text input aid can be carried out as follows. The HAVi user interface 42 monitors whether the text key of the remote control has been pressed. In this case, the only keys which are shown in the text input tool are those which are necessary for inputting text. Since the text key is used before the text tool is started and is no longer needed after this, it is no longer illustrated in FIG. 3.

After pressing the "text input key" on the remote control, a check is carried out to determine whether a text input field is focused, which may be located in a havlet, an application program or in the FAV's own user interface program.

After completion of the text input, the text input tool is ended, and the newly edited text is copied to the previously focused text input field. This is thus a universal text input aid, which can be used for all havlets/applications in the HAVi network.

The invention may be used in particular for a gateway which is used for connection of an HAVi network to a UPnP network. However, it is also feasible to use it for gateways which connect other networks to one another, for example an HAVi network to an OSGi network or a network such as EHS which is based on powerline data transmission to an IP network such as UPnP or OSGi.

What is claimed is:

1. A connection unit for connection of a network of a first type to a network of a second type, wherein the connection unit is an electronic device, having logging-off means which, when the information relating to the change to an input parameter for a network station in the network of the first type is input, perform logging-off of the network station which relates to the input parameter in the network of the second type, the connection unit having conversion means for conversion of the changed input parameter to a format which is suitable for the network of the second type, and having logging on means which, after conversion of the input parameter, once again perform logging-on of the network station which relates to the changed input parameter in the network of the second type, wherein the logging-off and logging-on again means are adapted to carry out said logging-off and logging-on in accordance with the Simple Service Discovery Protocol SSDP, in particular using the ssdp::byebye logging-off message and the ssdp::alive logging-on message.

2. The connection unit as claimed in claim 1, according to which the connection unit is adapted to support as the network of the first type a network which is based on an international standard called HAVi Standard, where HAVi stands for Home Audio/Video Interoperability.

3. The connection unit as claimed in claim 2, in which the input parameter is a HAVi defined parameter called UserPreferredName, which corresponds to the user defined name of a HAVi network station.

4. The method as claimed in claim 3, in which the input parameter UserPreferredName is mapped onto the information element FriendlyName of an XML appliance description for the HAVi network station which relates to the input parameter.

* * * * *